March 24, 1959     R. A. STRATE     2,878,564
DOUGH CUTTERS
Filed March 8, 1957
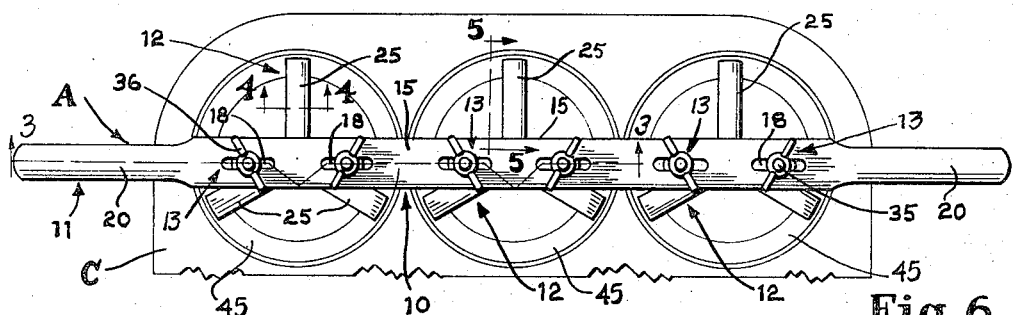
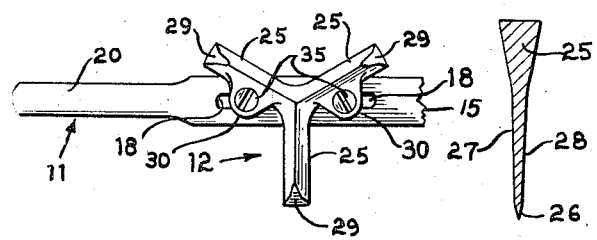
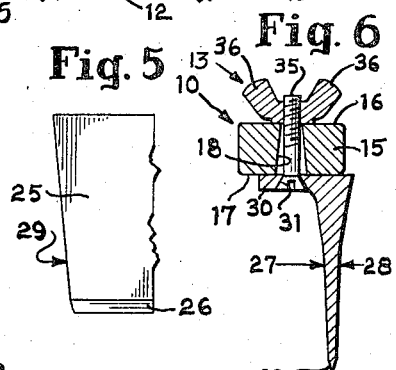
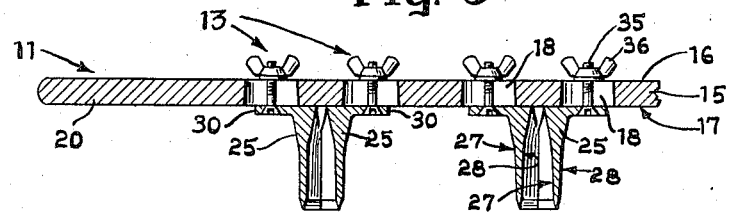
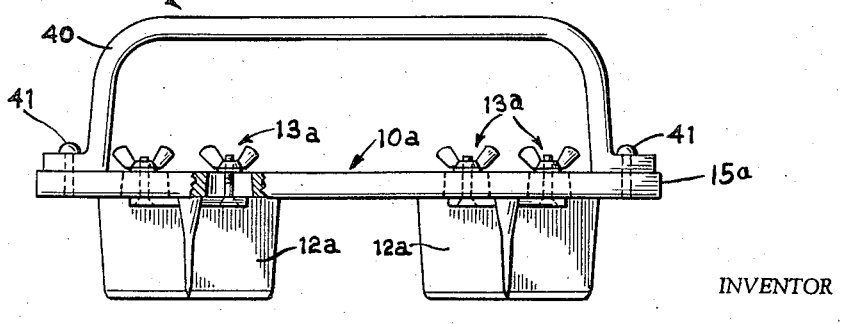
INVENTOR
ROBERT A. STRATE
ATTORNEYS

United States Patent Office 2,878,564
Patented Mar. 24, 1959

2,878,564

DOUGH CUTTERS

Robert A. Strate, Oklahoma City, Okla.

Application March 8, 1957, Serial No. 644,842

1 Claim. (Cl. 30—303)

This invention relates to cutters for use by chefs, cooks, bakers and the like in forming divisions of dough or the like, such as after the dough has been placed in a muffin or cup cake pan or like receptacle.

In preparing dough for baking into some forms of rolls, buns, etc., the surface of the dough is sometimes scored, indented or marked to indicate division lines, to provide ornamental designs, or divide the dough at the upper portion thereof, leaving the lower or bottom portion of the dough untouched.

An important object of this invention is to provide a dough or like material cutting unit which is adapted to cut a body of dough disposed in a pan, such as a conventional muffin or cup cake baking pan, into a plurality of segments from top to bottom.

Another important object is to provide units as last above which are adapted to be adjustably positioned in tandem along a support, to provide an implement so that a plurality of bodies of dough disposed in spaced apart compartments or cups of a pan, such as a muffin or cup cake pan, may be separated into segments by one operation of the implement.

Particularly where the implement may be employed continuously, over a considerable period of time, it is desirable that it be balanced so that, while adjustable, it will not be apt to tip in the hands of an operator. An important object of this invention is to provide a balanced implement for the purposes mentioned.

An additional important object is to provide an implement as described which is so constructed that the sight of the operator is not materially blocked by the implement when using it.

Other objects and advantages of the invention will be apparent during the course of the following detailed description of the invention, taken in connection with the accompanying drawing, forming a portion of the disclosure, and in which drawing:

Figure 1 is a top plan of one form of the implement of the invention, with the cutter units of the implement disposed within a plurality of compartments or cups of a pan.

Figure 2 is a fragmentary bottom plan view of the implement of Figure 1.

Figure 3 is a vertical longitudinal sectional view of the implement of Figure 1, substantially on the line 3—3 of Figure 1.

Figure 4 is an enlarged vertical transverse sectional view of one of the blades of a cutter unit substantially on the line 4—4 of Figure 1.

Figure 5 is a fragmentary side elevational view, on an enlarged scale, of one of the blades of a cutter unit substantially on the line 5—5 of Figure 1.

Figure 6 is a fragmentary vertical transverse sectional view, on an enlarged scale, of the implement of Figure 1.

Figure 7 is a side elevation of another form of the implement.

In the drawing, wherein for the purpose of illustration are shown two embodiments of the invention and wherein similar reference characters designate corresponding parts throughout the several views, the letters A and B designate two forms of the invention, and C, a pan or receptacle for dough or the like.

The implement A comprises a support means 10, handle means 11, a plurality of cutter units 12 and separate means 13 to adjustably support such cutter units 12 on the support means 10.

Support means 10 is preferably an elongated bar or body portion 15, preferably four-sided, as in Figure 6, in transverse section with an upper substantially flat face 16 and a lower or bottom substantially flat face 17. The bar is shown provided with a plurality of spaced-apart longitudinally extending slots 18. In the example shown, the slots are arranged in pairs, there being two adjacent slots for each cutter unit 12.

Handle means 11 is shown in Figure 1 as two handle portions 20 extending outwardly from the ends of the bar or body portion 15. The bar or body portion and handle portions are integral and may be of aluminum, aluminum alloy or the like.

Each cutter unit 12 includes a plurality of radially-extending blades or cutters 25. In the preferred example, there are three blades to a cutter unit, disposed substantially 120° apart, and joined together at their inner or meeting ends. As may be seen, as in Figure 4, each blade is in transverse cross section, tapered downwardly to a bevelled or knife edge 26, and presents two side faces 27 and 28. The side face 27 of one blade merges or joins the side face 28 of an adjacent blade and the edges 26 join each other at their inner ends, as may be seen in Figure 2. Each blade has a downwardly and inwardly tapered outer end edge 29 extending to the knife edge 26 and forming an obtuse angle therewith.

As may be seen in Figures 2 and 3, the cutter unit 12 is provided with two substantially flat wings 30 extending horizontally but non-radially outwardly from two of the blades 25 at their upper end portions and each wing may be provided with an opening 31, as the bevelled openings of Figures 3 and 6, to accommodate portions of the means 13 to be next described. The cutter units may each be of an integral body as of aluminum or alloy thereof.

Separate means 13 to adjustably support each cutter unit 12 on the support means 10 in cooperation with the slots 18 may comprise bevelled headed and blunt shank-ended screws 35 and wing nuts 36 for the shanks of the screws, with the heads of the screws accommodated in the bevelled openings 31 of the wings 30 and a shank extending through a slot 18 and projecting upwardly outwardly thereof to receive a wing nut 36 to bear against the face 16 of the bar 15, when tightened, and when the wings are in face contact with the lower face 17. Thus it will be seen that the positions of the cutter units 12 may be adjusted longitudinally of the bar 15 and releasably retained in such adjusted positions to accommodate the implement A to cups of various spacings in pans, such as the pan C.

The arrangement disclosed affords a balance to the implement since, as may be seen in Fig. 2, the amount of metal in the cutter unit blades overhanging the bar 15 is about the same to one side as the other side of the bar 15, and the wings 30 substantially straddle the longitudinal medial line of the bar 15.

In Figure 7 is shown the implement B which differs from the implement A only in the substitution of a bifurcated handle means 40 for the two end handle portions 20, with the handle means 40 secured to the bar or body portion 15ª of a support means 10ª as by screws 41, which body portion 15ᵃ carries cutter units 12ᵃ substantially along the bar 15ᵃ as by means 13ᵃ.

In the use of either implement A or B, when the cutter units thereof are properly adjusted to extend into the spaced-apart cups or compartments 45 of the pan C, as a conventional baking pan, and suitable portions of dough (not shown) or like material in round form is placed in the cups, and generally allowed to rise somewhat (as to within one-quarter the height of the mouth of the cup) the implement is grasped by the handle means 11 or 40 and the cutter units disposed in melted shortening or the like to substantially their full heights. The implement A or B is then positioned over the pan C so that the cutter units register with the cups and the cutter units pressed into the dough or the like in the cups, with the outer end edges of the blades contacting the bevelled walls of the cups, until the knife edges of the cutter unit blades reach the bottom walls of the cups. The implement may now be raised to draw the cutter units from the now segmented dough, or other medium. No further treatment is necessary by use of the implement and the segments will remain as such after raising and baking of the dough or the like.

The implements A and B may be readily cleaned, sterilized and dried since each cutter unit may be separated from the body portion of the implement support means.

I have discovered that the specific transverse cross sectional blade shape does not tend to distort the dough even though the latter is severed from top to bottom. With the use of shortening as directed, the dough does not come away with the cutter unit when the latter is withdrawn from the dough.

Various changes may be made to the forms of the invention herein shown and described without departing from the spirit of the invention or scope of the claim.

What is claimed is:

A cutting implement for cutting through a body of dough in a cup of a conventional baking pan into a plurality of wholly separated segments, said implement including support means having an elongated body portion, adapted to be horizontally disposed when in use; handle means for said body portion; a plurality of dough cutter units of rigid material carried by said elongated body portion in spaced-apart positions longitudinally thereof, each unit having three radially-extending blades of equal size, shape and weight, having lowermost knife edges, and a pair of horizontally-disposed wings extending nonradially from between each of two adjacent of said blades at the upper end portions thereof and in face contact with said body portion with the longitudinal axis of one blade extending normal to the longitudinal axis of said elongated body portion and with the outermost portion of said one blade extending outwardly beyond the vertical plane of one longitudinal edge of said elongated body portion and with the longitudinal axes of the other two blades being tangential to said longitudinal axis of said elongated body portion and with the outermost portions of the other two blades extending outwardly an equal distance beyond the vertical plane of the other longitudinal edge of said elongated body portion; and separate means for each cutter unit to adjustably support each cutter unit at the wings thereof, depending from said body portion, in a predetermined position longitudinally of said body portions with the weight of material of the portion of said one blade extending outwardly beyond the vertical plane of the first-named longitudinal edge being substantially equal to the combined weight of those portions of the other two blades extending outwardly beyond the vertical plane of the other of said longitudinal edges.

References Cited in the file of this patent
UNITED STATES PATENTS

| | | |
|---|---|---|
| 388,904 | Nash | Sept. 4, 1888 |
| 414,452 | Sidway | Nov. 5, 1889 |
| 648,540 | Thacher | May 1, 1900 |
| 2,296,912 | Erickson | Sept. 29, 1942 |
| 2,649,657 | Shaw | Aug. 25, 1953 |
| 2,716,282 | Kromsten | Aug. 30, 1955 |